United States Patent
Beukema et al.

(10) Patent No.: US 6,978,300 B1
(45) Date of Patent: Dec. 20, 2005

(54) METHOD AND APPARATUS TO PERFORM FABRIC MANAGEMENT

(75) Inventors: Bruce Leroy Beukema, Hayfield, MN (US); Danny Marvin Neal, Round Rock, TX (US); Gregory Michael Nordstrom, Pine Island, MN (US); Gregory Francis Pfister, Austin, TX (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 09/692,344

(22) Filed: Oct. 19, 2000

(51) Int. Cl.[7] .................. G06F 15/173; G06F 15/16; G06F 15/177; G06F 11/00
(52) U.S. Cl. ................. 709/223; 709/232; 709/242; 709/220; 370/230; 370/235
(58) Field of Search .................. 709/223, 225, 709/227, 232, 234, 238, 239, 242; 370/229, 230, 235, 236.1, 236.2

(56) References Cited

U.S. PATENT DOCUMENTS

| | | | |
|---|---|---|---|
| 4,638,356 A | 1/1987 | Frezza | 358/118 |
| 4,814,984 A | 3/1989 | Thompson | 364/200 |
| 4,939,752 A | 7/1990 | Literati et al. | 375/107 |
| 4,951,225 A * | 8/1990 | Lee et al. | 706/48 |
| 4,975,829 A | 12/1990 | Clarey et al. | 364/200 |
| 5,043,981 A * | 8/1991 | Firoozmand et al. | 370/235 |
| 5,185,741 A | 2/1993 | Iguchi et al. | 370/110.1 |
| 5,278,984 A * | 1/1994 | Batchelor | 719/314 |
| 5,402,416 A * | 3/1995 | Cieslak et al. | 370/236 |
| 5,461,608 A | 10/1995 | Yoshiyama | 370/16.1 |
| 5,513,368 A * | 4/1996 | Garcia, Jr. et al. | 710/22 |
| 5,551,066 A | 8/1996 | Stillman et al. | 455/69 |
| 5,603,029 A * | 2/1997 | Aman et al. | 718/105 |
| 5,610,980 A | 3/1997 | Johnson et al. | 380/4 |
| 5,623,693 A * | 4/1997 | Ashton et al. | 710/5 |
| 5,719,938 A | 2/1998 | Haas et al. | 380/21 |
| 5,729,686 A | 3/1998 | Heck et al. | |
| 5,758,083 A | 5/1998 | Singh et al. | 395/200.53 |
| 5,778,176 A | 7/1998 | Geihs et al. | 395/200.12 |
| 5,793,968 A | 8/1998 | Gregerson et al. | 395/200.39 |
| 5,805,072 A | 9/1998 | Kakemizu | 340/825.03 |
| 5,884,036 A | 3/1999 | Haley | 395/200.54 |
| 5,907,689 A | 5/1999 | Tavallaei et al. | 395/290 |
| 5,951,683 A | 9/1999 | Yuuki et al. | 713/1 |
| 6,032,191 A * | 2/2000 | Chowdhury et al. | 709/238 |
| 6,081,752 A | 6/2000 | Benson, IV et al. | 700/79 |
| 6,085,238 A * | 7/2000 | Yuasa et al. | 709/223 |
| 6,091,709 A * | 7/2000 | Harrison et al. | 370/235 |
| 6,092,214 A | 7/2000 | Quoc et al. | 714/4 |
| 6,115,776 A | 9/2000 | Reid et al. | 710/260 |
| 6,128,738 A | 10/2000 | Doyle et al. | 713/185 |
| 6,192,397 B1 | 2/2001 | Thompson | 709/209 |
| 6,199,133 B1 | 3/2001 | Schnell | 710/110 |
| 6,222,822 B1 * | 4/2001 | Gerardin et al. | 370/230 |
| 6,269,396 B1 * | 7/2001 | Shah et al. | 709/223 |
| 6,298,376 B1 | 10/2001 | Rosner et al. | 709/209 |

(Continued)

*Primary Examiner*—Hosain Alam
*Assistant Examiner*—Kevin Bates
(74) *Attorney, Agent, or Firm*—Duke W. Yee; Mark E. McBurney; Stephen J. Walder, Jr.

(57) ABSTRACT

A method and apparatus to perform network fabric management is provided. The method and apparatus provide a mechanism by which modifications to components of the network fabric may be made without tearing down existing connections. The apparatus and method facilitate such fabric management by placing send queues in a send queue drain state and suspending the send queues affected by changes to the network fabric while the modifications are being made. Once the modifications are complete, the send queues are place back into an operational state.

21 Claims, 5 Drawing Sheets

U.S. PATENT DOCUMENTS

| | | | |
|---|---|---|---|
| 6,304,973 B1 | 10/2001 | Williams | 713/201 |
| 6,311,321 B1 | 10/2001 | Agnihotri et al. | 717/1 |
| 6,341,322 B1 | 1/2002 | Liu et al. | 710/129 |
| 6,343,320 B1 | 1/2002 | Fairchild et al. | 709/224 |
| 6,363,411 B1 | 3/2002 | Dugan et al. | 709/202 |
| 6,363,416 B1 | 3/2002 | Naeimi et al. | 709/209 |
| 6,363,495 B1 | 3/2002 | MacKenzie et al. | 714/4 |
| 6,389,432 B1 | 5/2002 | Pothapragada et al. | 707/205 |
| 6,434,113 B1 | 8/2002 | Gubbi | 370/216 |
| 6,470,397 B1 | 10/2002 | Shah et al. | 709/250 |
| 6,507,592 B1 | 1/2003 | Hurvig et al. | 370/503 |
| 6,597,956 B1 | 7/2003 | Aziz et al. | 700/3 |
| 6,654,363 B1 * | 11/2003 | Li et al. | 370/338 |
| 6,658,417 B1 | 12/2003 | Stakutis et al. | 707/10 |
| 6,664,978 B1 | 12/2003 | Kekic et al. | 345/733 |
| 6,665,714 B1 | 12/2003 | Blumenau et al. | 709/222 |
| 6,694,361 B1 | 2/2004 | Shah et al. | 709/222 |
| 6,708,272 B1 | 3/2004 | McCown et al. | 713/151 |
| 6,766,467 B1 * | 7/2004 | Neal et al. | 714/5 |
| 2002/0021307 A1 | 2/2002 | Glenn et al. | 345/753 |
| 2002/0073257 A1 | 6/2002 | Beukema et al. | 710/105 |
| 2003/0018787 A1 | 1/2003 | Neal et al. | 709/227 |
| 2003/0046505 A1 | 3/2003 | Craddock et al. | 711/165 |
| 2004/0057424 A1 | 3/2004 | Kokkonen | 370/352 |

* cited by examiner

METHOD AND APPARATUS TO PERFORM FABRIC MANAGEMENT

CROSS REFERENCES TO RELATED APPLICATIONS

The present invention is related to applications entitled A System Area Network of End-to-End Context via Reliable Datagram Domains, U.S. patent application Ser. No. 09/692,354; Method and Apparatus for Pausing a Send Queue without Causing Sympathy Errors, Ser. No. 09/692,340; End Node Partitioning using LMC for a System Area Network, U.S. patent application Ser. No. 09/692,351; Method and Apparatus for Dynamic Retention of System Area Network Management Information in Non-Volatile Store, U.S. patent application Ser. No. 09/692,365; Method and Apparatus for Retaining Network Security Settings Across Power Cycles, U.S. patent application Ser. No. 09/692,337; Method and Apparatus for Reporting Unauthorized Attempts to Access Nodes in a Network Computing System, U.S. patent application Ser. No. 09/692,348; Method and Apparatus for Reliably Choosing a Master Network Manager During Initialization of a Network Computing System, U.S. patent application Ser. No. 09/692,346; Method and Apparatus for Ensuring Scalable Mastership During Initialization of a System Area Network, U.S. patent application Ser. No. 09/692,341; and Method and Apparatus for Using a Service ID for the Equivalent of Port ID in a Network Computing System, U.S. patent application Ser. No. 09/692,352, all of which are filed even date hereof, assigned to the same assignee, and incorporated herein by reference.

BACKGROUND OF THE INVENTION

1. Technical Field

The present invention relates generally to an improved data processing system, and in particular to a method and apparatus to perform fabric management. More specifically, the present invention provides a method and apparatus for pausing a send queue such that fabric attributes and components may be modified without tearing down existing fabric connections.

2. Description of Related Art

In a System Area Network (SAN), the hardware provides a message passing mechanism which can be used for Input/Output devices (I/O) and interprocess communications between general computing nodes (IPC). Processes executing on devices access SAN message passing hardware by posting send/receive messages to send/receive work queues on a SAN channel adapter (CA). These processes also are referred to as "consumers".

The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

SAN fabric components, e.g., switches, routers and channel adapters, have several attributes assigned to them by a subnet manager. These attributes are accessible from a subnet administrator. The subnet manager is responsible for discovering, initializing, configuring and maintaining SAN fabric components. The subnet administrator is used to update and query some of the attributes assigned to the SAN fabric components. However, some of the attributes can only be assigned by the subnet manager during fabric initialization. Thus, in order to change these attributes, established connections in the SAN fabric must be torn down, the attributes changed, and the connections rebuilt in view of the changed attributes. It would therefore, be beneficial to have a method and apparatus for modifying SAN fabric components and component attributes without having to tear down existing connections.

SUMMARY OF THE INVENTION

The present invention provides a method and apparatus to perform network fabric management. The method and apparatus provide a mechanism by which modifications to components of the network fabric may be made without tearing down existing connections. The apparatus and method facilitate such fabric management by placing send queues in a send queue drain state and suspending the send queues affected by changes to the network fabric while the modifications are being made. Once the modifications are complete, the send queues are place back into an operational state.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a distributed computing system having end nodes, switches, routers, and links interconnecting these components. Each end node uses send and receive queue pairs to transmit and receives messages. The end nodes segment the message into packets and transmit the packets over the links. The switches and routers interconnects the end nodes and route the packets to the appropriate end node. The end nodes reassemble the packets into a message at the destination.

Figure 1:
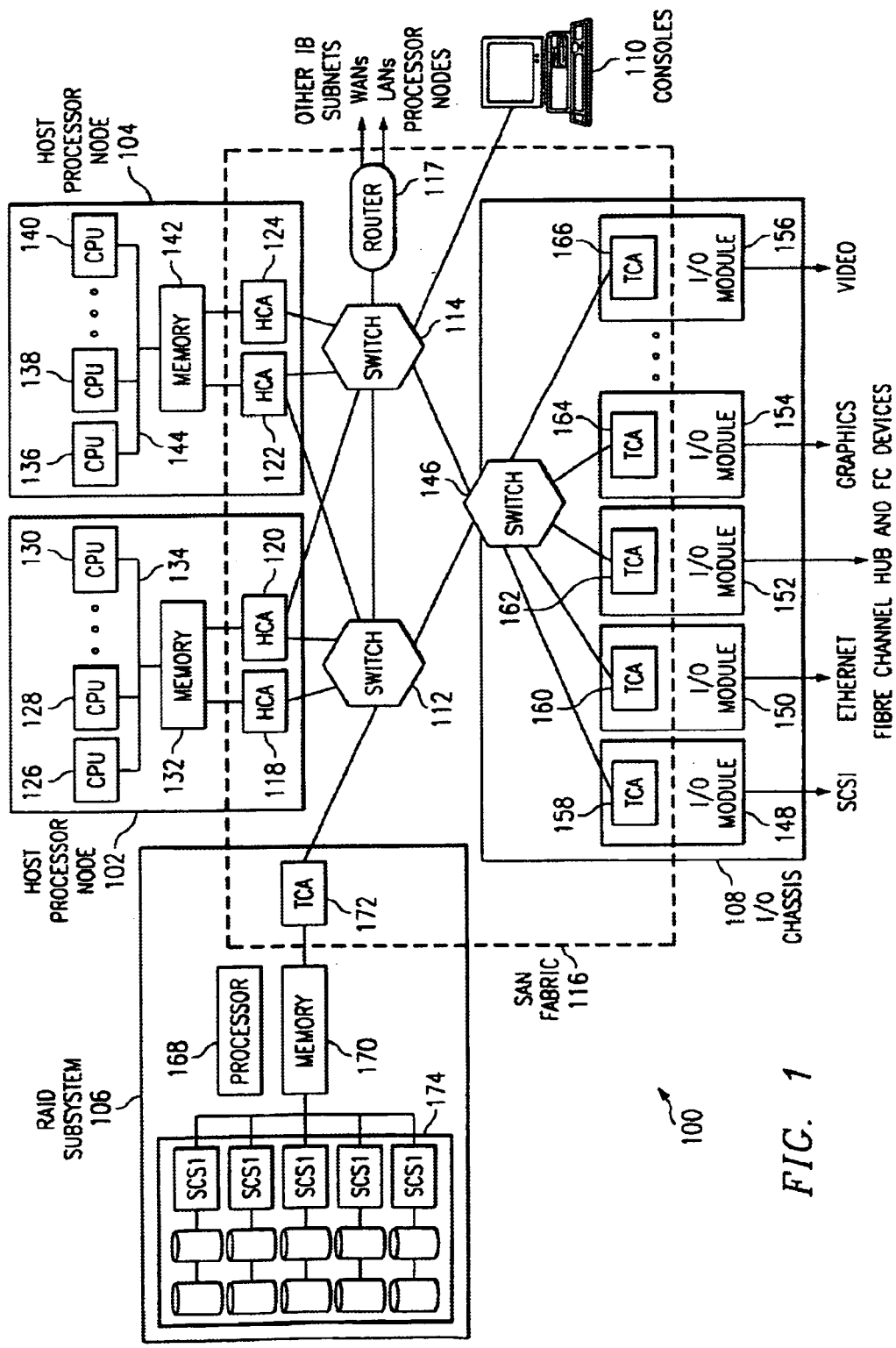
FIG. 1 is a diagram of a distributed computer system is illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers.

The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop(FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernal process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source devices pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communication the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
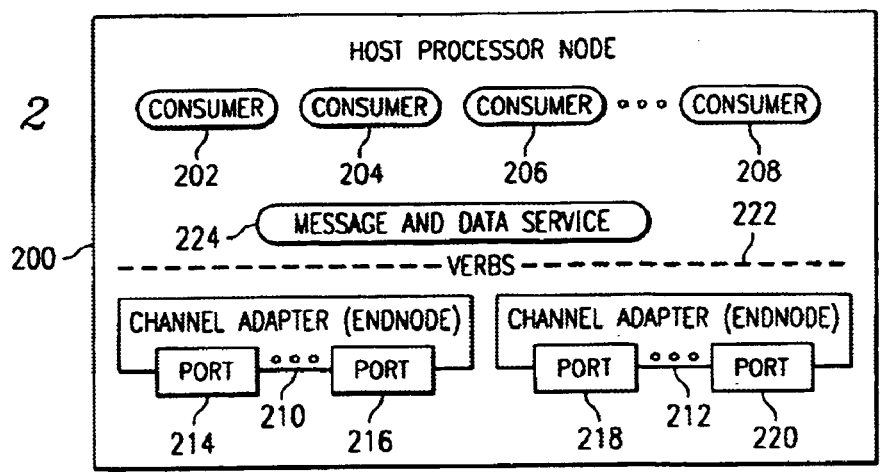
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher level interface than the,verb layer and is used to process messages and data received through channel adapter 210 and channel adapter 212. Message and data service 224 provides an interface to consumers 202–208 to process messages and other data.

Figure 3:
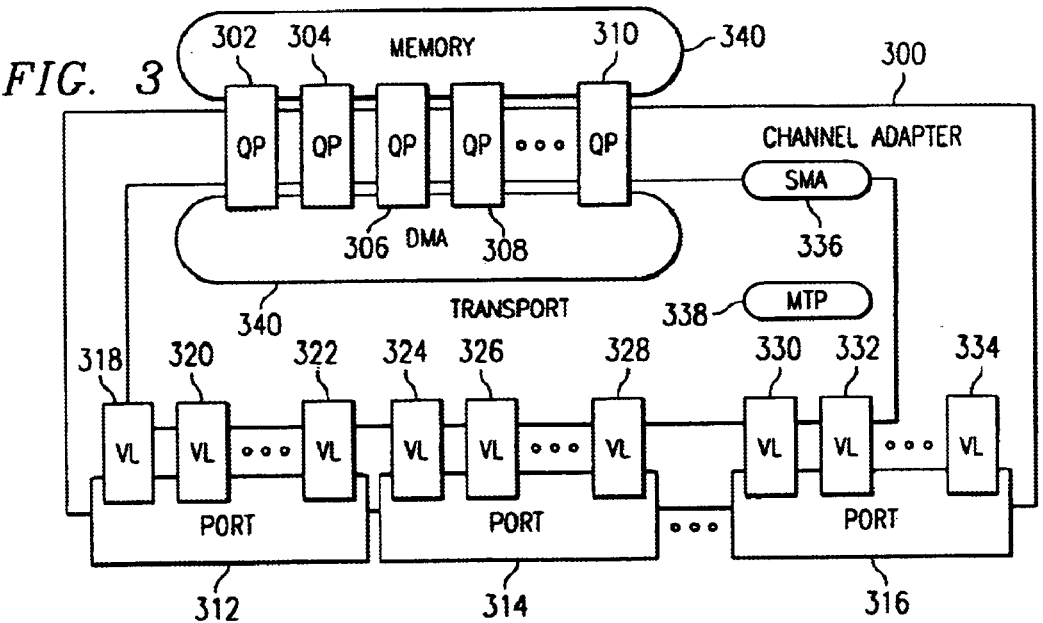
FIG. 3 is a diagram of a host channel adapter in accordance with a preferred embodiment of the present invention.

With reference now to FIG. 3, a diagram of a host channel adapter is depicted in accordance with a preferred embodiment of the present invention. Host channel adapter 300 shown in FIG. 3 includes a set of queue pairs (QPs) 302–310, which are used to transfer messages to the host channel adapter ports 312–316. Buffering of data to host channel adapter ports 312–316 is channeled through virtual lanes (VL) 318–334 where each VL has its own flow control. Subnet manager configures channel adapters with the local addresses for each physical port, i.e., the port's LID. Subnet manager agent (SMA) 336 is the entity that communicates with the subnet manager for the purpose of configuring the channel adapter. Memory translation and protection (MTP) 338 is a mechanism that translates virtual addresses to physical addresses and validates access rights. Direct memory access (DMA) 340 provides for direct memory access operations using memory 340 with respect to queue pairs 302–310.

A single channel adapter, such as the host channel adapter 300 shown in FIG. 3, can support thousands of queue pairs. By contrast, a target channel adapter in an I/O adapter typically supports a much smaller number of queue pairs.

Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 4:
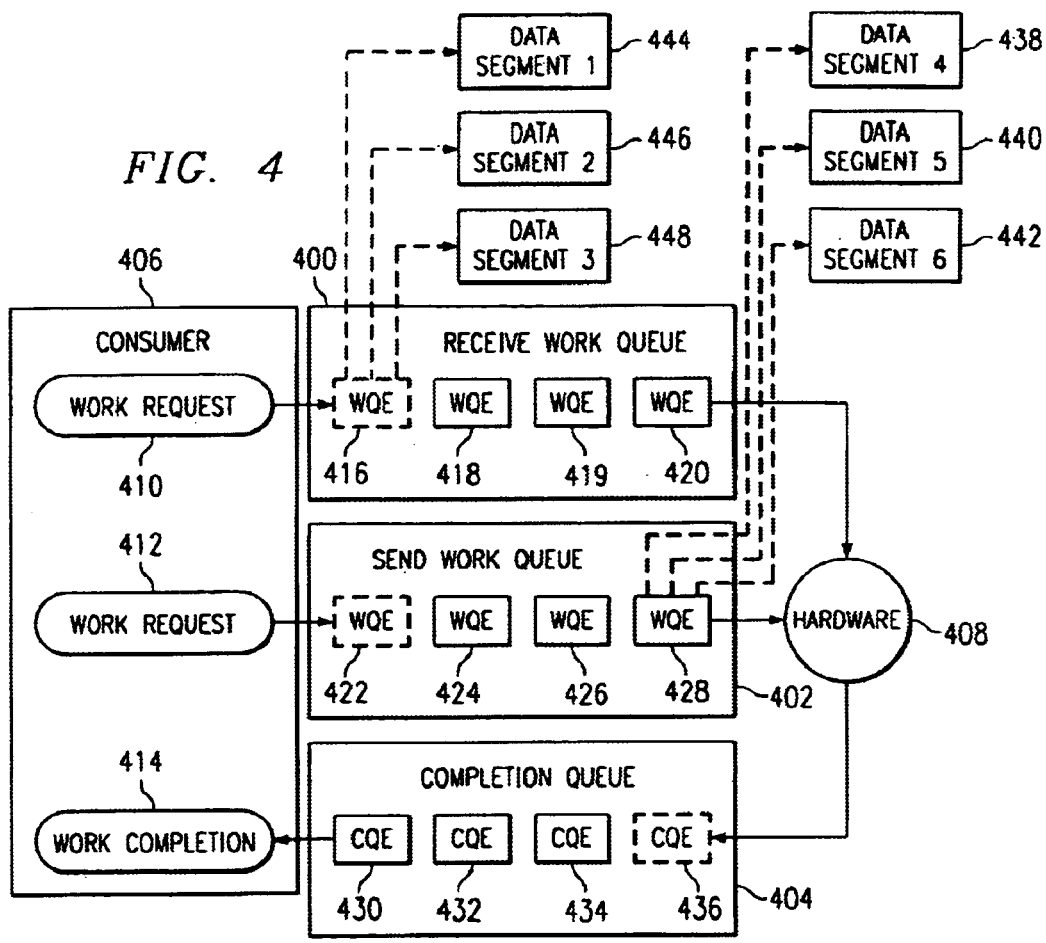
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses which have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA Fetchop work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service.

Reliable and Unreliable connected services associate a local queue pair with one and only one remote queue pair. Connected services require a process to create a queue pair for each process which is to communicate with over the SAN fabric. Thus, if each of N host processor nodes contain P processes, and all P processes on each node wish to communicate with all the processes on all the other nodes, each host processor node requires $p^2 \times (N-1)$ queue pairs. Moreover, a process can connect a queue pair to another queue pair on the same host channel adapter.

Figure 5:
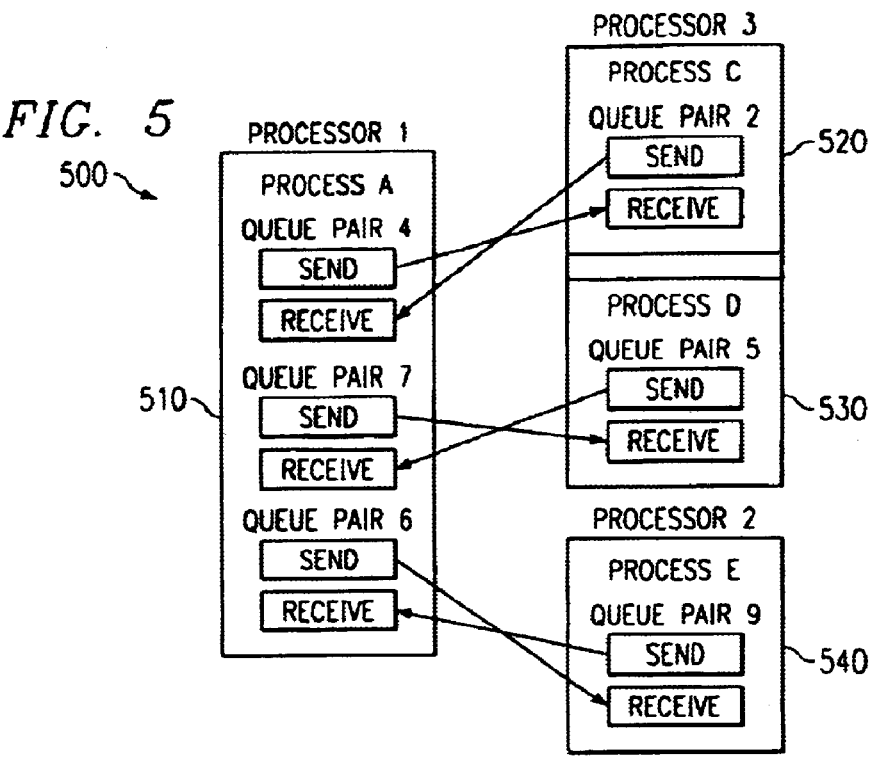
FIG. 5 is a diagram illustrating a portion of a distributed computer system in accordance with a preferred embodiment of the present invention.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of the distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive under-runs, and network congestion. If alternative paths exist in the SAN fabric, reliable communications can be maintained even in the presence of failures of fabric switches, links, or channel adapter ports.

In addition, acknowledgements may be employed to deliver data reliably across the SAN fabric. The acknowledgement may, or may not, be a process level acknowledgement, i.e. an acknowledgement that validates that a receiving process has consumed the data. Alternatively, the acknowledgement may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $p^2 \times (N-1)$ queue pairs on each node. By comparison, the connectionless reliable datagram service only requires P queue pairs+(N−1) EE contexts on each node for exactly the same communications.

Figure 6:
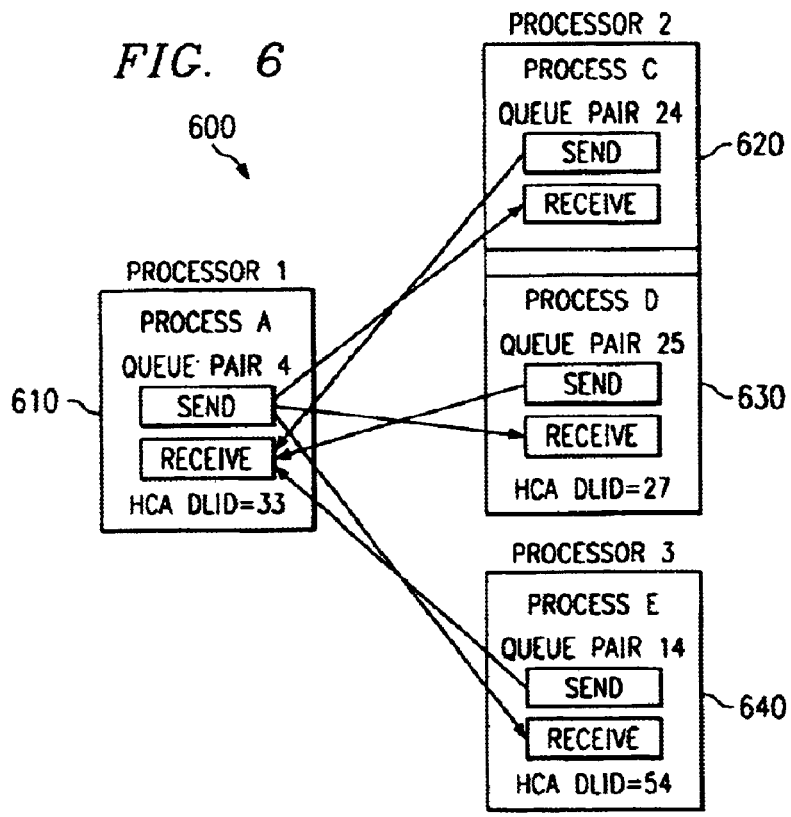
FIG. 6 is a diagram illustrating a portion of a distributed computer system in accordance with a preferred embodiment of the present invention in which reliable datagram service connections are used.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process, D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgements associated with each message frame to ensure the same degree of reliability as the reliable connection service. End-to-end (EE) contexts maintain end-to-end specific state to keep track of sequence numbers, acknowledgements, and time-out values. The end-to-end state held in the EE contexts is shared by all the connectionless queue pairs communication between a pair of endnodes. Each endnode requires at least one EE context for every endnode it wishes to communicate with in the reliable datagram service (e.g., a given endnode requires at least N EE contexts to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 7:
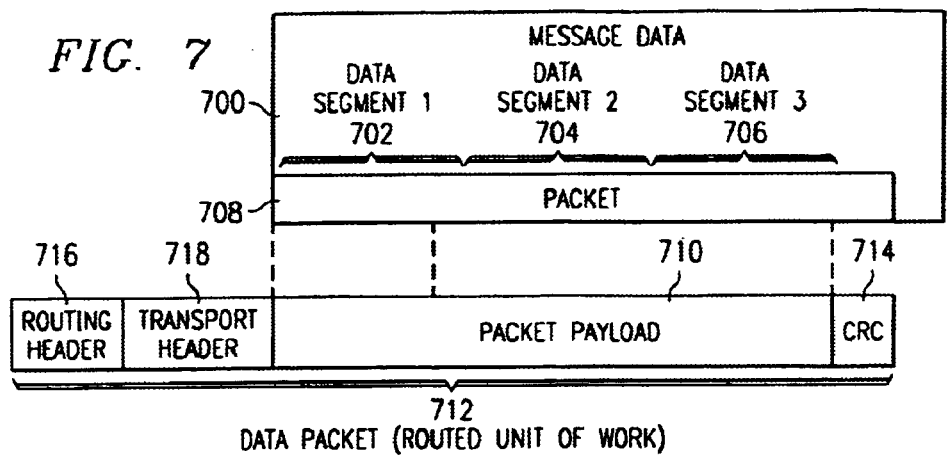
FIG. 7 is an illustration of a data packet in accordance with a preferred embodiment of the present invention.

Turning next to FIG. 7, an illustration of a data packet is depicted in accordance with a preferred embodiment of the present invention. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

A data transaction in the distributed computer system of the present invention is typically composed of several hardware and software steps. A client process data transport service can be a user-mode or a kernel-mode process. The client process accesses host channel adapter hardware through one or more queue pairs, such as the queue pairs illustrated in FIGS. 3, 5, and 6. The client process calls an operating-system specific programming interface, which is herein referred to as verbs. The software code implementing the verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, channel adapter hardware detects work queue element postings and accesses the work queue element. In this embodiment, the channel adapter hardware translates and validates the work queue element's virtual addresses and accesses the data.

An outgoing message is split into one or more data packets. In one embodiment, the channel adapter hardware adds a transport header and a network header to each packet. The transport header includes sequence numbers and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination endnode resides on a remote subnet.

If a reliable transport service is employed, when a request data packet reaches its destination endnode, acknowledgment data packets are used by the destination endnode to let the request data packet sender know the request data packet was validated and accepted at the destination. Acknowledgement data packets acknowledge one or more valid and accepted request data packets. The requester can have multiple outstanding request data packets before it receives any acknowledgments. In one embodiment, the number of multiple outstanding messages, i.e. Request data packets, is determined when a queue pair is created.

Figure 8:
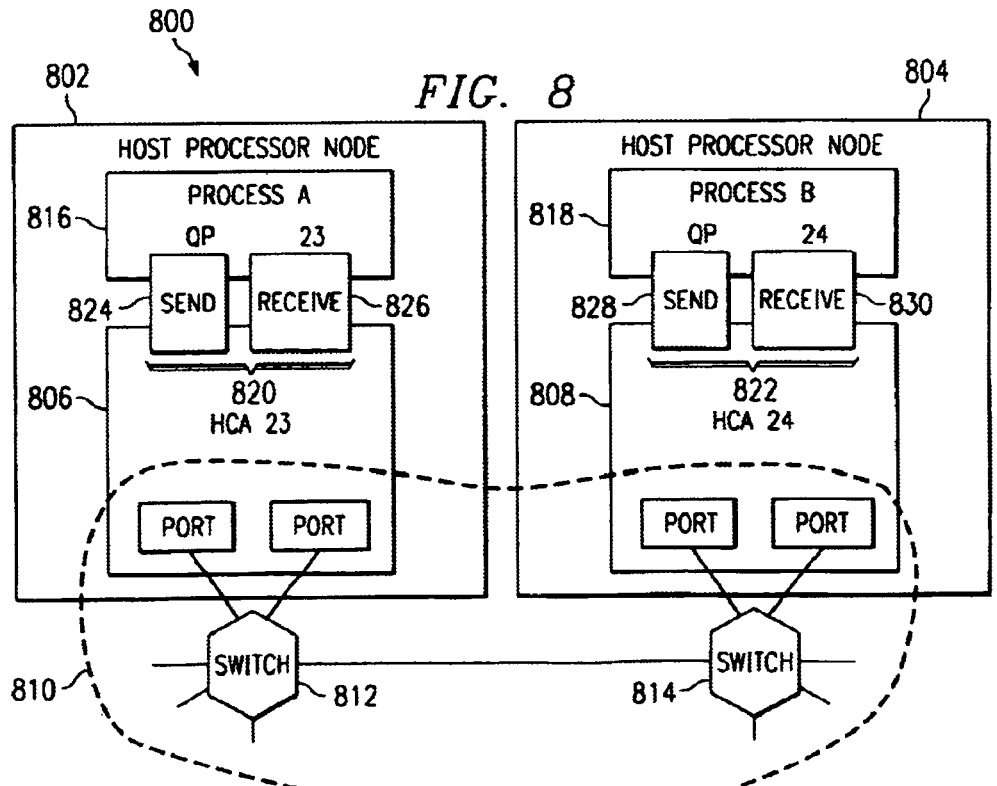
FIG. 8 is a diagram illustrating a portion of a distributed computer system in accordance with a preferred embodiment of the present invention.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 824. Client process B interacts with hardware channel adapter hardware 808 through queue pair 828. Queue pairs 824 and 828 are data structures that include a send work queue and a receive work queue.

Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

Figure 9:
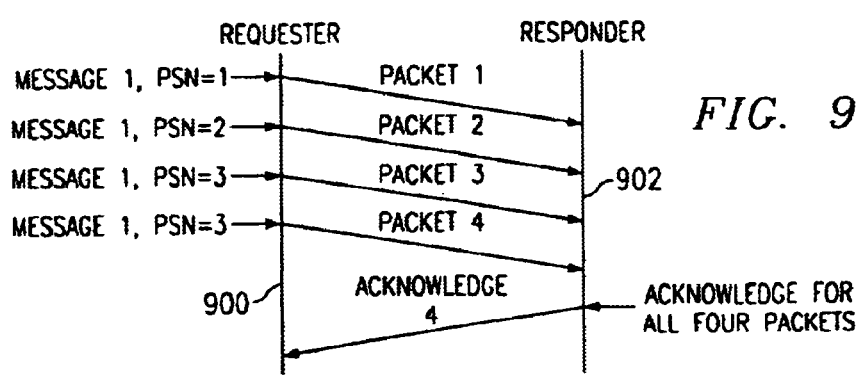
FIG. 9 is a diagram illustrating acknowledgement messaging in accordance with a preferred embodiment of the present invention.

Referring now to FIG. 9, a example message transfer between a requester and a responder is depicted. The requester in FIG. 9 may be, for example, the host processor node 802 in FIG. 8 and the responder may be the host processor node 804. As shown in FIG. 9, the send request message is transmitted from host channel adapter 806 in host processor node 802 to host channel adapter 808 in host processor node 804 as packets 1, 2, 3, and 4. Acknowledgment packet 4 acknowledges that all 4 request packets were received.

The message in FIG. 9 is assumed to be transmitted with a reliable transport service. Switches (and routers) that relay the request and acknowledgement data packets do not generate any data packets themselves. Rather, only the source and destination host channel adapters generate request data packets and aknowledgement data packets, respectively.

Each device in a subnet, including channel adapters, must have a Management Agent function which has all of the capabilities required for it to communicate with a Subnet Manager. A subnet manager communicates over the subnet utilizing packets called Management Datagrams (MADs). There are numerous management services that a subnet manager and Subnet Administrator provide to allow it to discover, configure, and manage a subnet, much of which is beyond the scope of this invention. However, the following definitions will be helpful in understanding the following sections of this document:

General Management Packets (GMPs) are MADs that allow management operations between a Subnet Manager and SAN devices and management operations between SAN devices themselves;

Event Subscription is a Subnet Administration Method for allowing devices in a subnet to track events that occur in a subnet, including modifications of a subnet and paths within a subnet;

SubnAdmReport is a management construct that forwards an event previously subscribed for;

Generic Services Interface (GSI) is one of the services provided by Subnet Administration software used to manage a SAN subnet;

PathRecord is a whole set of information used by subnet management and end nodes for recording the various Ids, addresses and other control information to identify paths between end nodes in a subnet and track modifications;

Modification ID is a field in PathRecord;

General Service Interface Consumer is a service within the Subnet Agents of each SAN device;

$P_{13}$ Keys are protection keys that are utilized within the SAN fabric as one level of security validation;

LIDs are addresses assigned to a port by the subnet manager, unique within the subnet, and used for directing packets within a subnet. There also is a Source Local Identifier (SLID) and a Destination Local Identifier (DLID), both of which are present in the Local Route Header. A Local Identifier is formed by the sum of the Base LID and value of the Path Bits; and Local Route Header is a routing header present in SAN packets, used for routing through switches within a subnet.

With the present invention, when an attribute needs to be modified on one or more components in the SAN fabric, the send work queues of the affected components are placed in a send queue drain (SQD) state. The SQD state can only be entered from a ready-to-send state. While in the SQD state, the following functions can be performed:

1) write requests can be posted to the queue pair's send and receive work queues;

2) incoming messages targeted for the queue pair are processed normally; and 3) work requests submitted to the send queue of a queue pair in the SQD state must not be processed but shall remain queued.

For the reliable datagram Service, work requests submitted to the send queue of a reliable datagram queue pair are queued, but not processed, if the queue pair is in the SQD state.

The send work queue stops processing on a message boundary. When processing stops, an asynchronous event notification is used to let the consumer know processing is completed. This state of completion is referred to as, the send work queue has been drained even though (by item 1 above) additional items may have been added to the send queue.

Once the send work queue has been drained, the subnet manager can safely modify the attributes of the affected components. After the subnet manager has modified the attributes, the subnet administrator can request communications to be restarted. At this point the send work queues will resume communications using the new attributes.

In order to perform the above functions for modifying attributes of components of the SAN fabric, the following operations are performed. Initially all end nodes request event subscription for path modifications. For example, initially all channel adapters on the SAN fabric subnet may send the subnet administrator a request event subscription for PathRecord Modifications. The existing PathRecord general management packet will be used to manage path attribute modifications without tearing down existing connections.

The subnet administrator requests suspension of connected queue pairs whose paths are being modified through an event subscription method. For example, the subnet administrator may use a PathRecord (with two additional fields) SubnAdmReport general management packet to request the suspension of messages on queue pairs over an existing path. One of the additional fields in the PathRecord is a Path Record Modification ID that is used by a general service interface consumer, e.g. communication manager, to identify a specific Path Modification. The general service interface consumer uses the Path Record Modification ID to determine which queue pairs are to be placed back in a ready-to-send state.

The PathRecord general management packet is sent to the general service interface queue pairs of all end-node ports. Alternatively, the general management packet may be sent to only the nodes which have requested PathRecords from the subnet administrator that are congruent with the PathRecord affected by the SAN fabric change. In either case, in response to the subnet administrator request via the PathRecord general management packet, all SAN fabric nodes suspend affected queue pairs. That is, for example, the general service interface consumer may determine which queue pairs are affected by the suspension request. The general service interface consumer at each node affected by the change places all affected queue pairs in the send queue drain state, by setting a bit or field in a queue pair table identifying the queue pair as being in a SQD state.

The subnet manager then changes path attributes on all affected nodes. For example, for each queue pair placed in the send queue drain state, the corresponding host channel adapter:

1) stops processing of new outbound messages at the next message boundary;

2) waits for messages outstanding (on the wire) to be acknowledged; and 3) after all outstanding messages have been acknowledged, the host channel adapter surfaces an asynchronous event (i.e. an interrupt) indicating the queue pair is now in the SQD state.

When all queue pairs affected by the change have returned an asynchronous affiliated event, the general service interface consumer may respond to the original SubnAdmReport general management packet with a PathRecord (with two additional fields) SubnAdmReportResp general management packet indicating the change has been completed. The subnet administrator may then receive the SubnAdmReportResp general management packet responses from all nodes.

The subnet manager may use a set of subnet management datagram (MAD) packets to modify path attributes that can only be modified by the subnet manager (e.g., LIDs, P_Keys, etc.). Each node then responds back to the subnet manager indicating the changes were made effectively.

The subnet administrator then requests re-start of all suspended queue pairs whose paths have been modified through an event subscription method. The subnet administrator may use a PathRecord (with two additional fields) SubnAdmReport general management packet to request return to normal operations for the paths affected. The general management packets may be sent to the general service interface queue pairs of all end-node ports affected by the change. The general service interface consumers at each node may analyze the PathRecord SubnAdmReport general management packet received from the subnet administrator to determine which queue pairs need to be transitioned to the ready-to-send state. The general service interface consumer may then transition all affected queue pairs to the ready-to-send state.

After all queue pairs affected by the change are back in the ready-to-send state, the general service interface consumer may respond to the general management packet by issuing SubnAdmReportResp general management packet indicating the change was successful and all connections are back to full operation. In this way, all SAN fabric nodes restart affected queue pairs.

Figure 10:
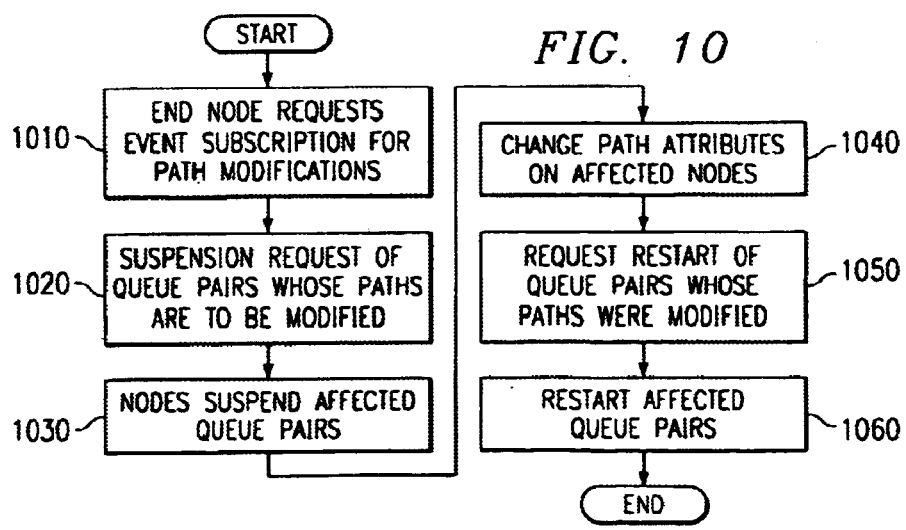
FIG. 10 is a flowchart of outlining an exemplary operation of the present invention.

FIG. 10 is a flowchart outlining an exemplary operation of the present invention when suspending send queues to affect SAN fabric attribute changes. As shown in FIG. 10, the operation starts with an end node requesting event subscription for path modifications (step 1010). Then a suspension request of queue pairs whose paths are to be modified is sent out to the end nodes (step 1020). The nodes then suspend the affected queue pairs (step 1030) and path attributes are changed on the affected nodes (step 1040). A request to restart the queue pairs whose paths were modified is sent to each of the end nodes (step 1050). The affected queue pairs are then restarted (step 1060).

Thus, the present invention provides a method and apparatus for managing a network fabric such that modifications to components of the fabric may be made without tearing down existing connections. The present invention facilitates such fabric management by placing send queues in a send queue drain state and suspends send queues affected by changes to the network fabric while the modifications are being made. Once the modifications are complete, the send queues are place back into an operational state.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations-will be apparent to those of ordinary skill in the art. For example, although the illustrations show communications from one node to another node, the mechanisms of the present invention may be implemented between different processes on the same node. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for modifying a network without tearing down existing connections, comprising:
   identifying a modification to the network that is to be made;
   identifying a send queue that is to be affected by the modification;
   placing the send queue that is to be affected by a modification to the network into a suspended state;
   wherein while in the suspended state, write requests can be posted to a queue pair of the send queue, incoming messages to the queue pair of the send queue are processed normally, and work requests submitted to the send queue are queued and are not processed;
   applying the modification to the network; and
   placing the send queue back into an operational state after applying the modification to the network.

2. The method of claim 1, wherein the suspended state is a send queue drain state.

3. The method of claim 1, wherein placing the send queue into a suspended state includes stopping processing of messages in the send queue at a message boundary.

4. The method of claim 1, further comprising sending a notification to a subnet manager that the send queue has been placed in a suspended state, wherein the modification to the network is applied in response to sending the notification.

5. The method of claim 1, wherein placing the send queue into a suspended state includes using a PathRecord SubnAdmReport general management packet to request suspension of messages on a queue pair over an existing path in the network.

6. The method of claim 5, wherein placing the send queue back into an operational state after applying the modification to the network includes identifying the send queue based on a Path Record Modification ID included in the PathRecord SubnAdmReport general management packet.

7. The method of claim 5, further comprising receiving a PathRecord SubnAdmReportResp general management packet in response to the PathRecord SubnAdmReport general management packet indicating that the modification to the network has been applied, wherein the send queue is placed back into an operation state in response to receiving the PathRecord SubnAdmReportResp general management packet.

8. An apparatus for modifying a network without tearing down existing connections, comprising:
   identifying a modification to the network that is to be made;
   identifying a send queue that is to be affected by the modification;
   placing the send queue that is to be affected by a modification to the network into a suspended state;
   wherein while in the suspended state, write requests can be posted to a queue pair of the send queue, incoming messages to the queue pair of the send queue are processed normally, and work requests submitted to the send queue are queued and are not processed;
   applying the modification to the network; and
   placing the send queue back into an operational state after applying the modification to the network.

9. The apparatus of claim 8, wherein the suspended state is a send queue drain state.

10. The apparatus of claim 8, wherein the means for placing the send queue into a suspended state includes means for stopping processing of messages in the send queue at a message boundary.

11. The apparatus of claim 8, further comprising means for sending a notification to a subnet manager that the send queue has been placed in a suspended state, wherein the modification to the network is applied in response to sending the notification.

12. The apparatus of claim 8, wherein the means for placing the send queue into a suspended state includes means for using a PathRecord SubnAdmnReport general management packet to request suspension of messages on a queue pair over an existing path in the network.

13. The apparatus of claim 12, wherein the means for placing the send queue back into an operational state after applying the modification to the network includes means for identifying the send queue based on a Path Record Modification ID included in the PathRecord SubnAdmReport general management packet.

14. The apparatus of claim 12, further comprising means for receiving a PathRecord SubnAdmReportResp general management packet in response to the PathRecord SubnAdmReport general management packet indicating that the modification to the network has been applied, wherein the send queue is placed back into an operation state in response to receiving the PathRecord SubnAdmReportResp general management packet.

15. A computer program product in a computer readable medium for modifying a network without tearing down existing connections, comprising:
   identifying a modification to the network that is to be made;
   identifying a send queue that is to be affected by the modification;
   placing the send queue that is to be affected by a modification to the network into a suspended state;
   wherein while in the suspended state, write requests can be posted to a queue pair of the send queue, incoming messages to the queue pair of the send queue are processed normally, and work requests submitted to the send queue are queued and are not processed;
   applying the modification to the network; and
   placing the send queue back into an operational state after applying the modification to the network.

16. The computer program product of claim 15, wherein the suspended state is a send queue drain state.

17. The computer program product of claim 15, wherein the third instructions for placing the send queue into a suspended state includes instructions for stopping processing of messages in the send queue at a message boundary.

18. The computer program product of claim 15, further comprising sixth instructions for sending a notification to a subnet manager that the send queue has been placed in a suspended state, wherein the modification to the network is applied in response to sending the notification.

19. The computer program product of claim 15, wherein the third instructions for placing the send queue into a suspended state includes instructions for using a PathRecord SubnAdmReport general management packet to request suspension of messages on a queue pair over an existing path in the network.

20. The computer program product of claim 19, wherein the fifth instructions for placing the send queue back into an operational state after applying the modification to the network includes instructions for identifying the send queue based on a Path Record Modification ID included in the PathRecord SubnAdmReport general management packet.

21. The computer program product of claim 19, further comprising sixth instructions for receiving a PathRecord SubnAdmReportResp general management packet in response to the PathRecord SubnAdmReport general management packet indicating that the modification to the network has been applied, wherein the send queue is placed back into an operation state in response to receiving the PathRecord SubnAdmReportResp general management packet.

* * * * *